US012539434B2

(12) United States Patent
Pouppeville

(10) Patent No.: US 12,539,434 B2
(45) Date of Patent: Feb. 3, 2026

(54) ENERGY ABSORBER AND METHOD FOR MANUFACTURING SUCH

(71) Applicant: ZEDEL, Crolles (FR)

(72) Inventor: Victor Pouppeville, Porte de Savoie (FR)

(73) Assignee: ZEDEL, Crolles (FR)

( * ) Notice: Subject to any disclaimer, the term of this patent is extended or adjusted under 35 U.S.C. 154(b) by 34 days.

(21) Appl. No.: 18/736,737

(22) Filed: Jun. 7, 2024

(65) Prior Publication Data

US 2024/0416160 A1 Dec. 19, 2024

(30) Foreign Application Priority Data

Jun. 19, 2023 (FR) ...................................... 2306303

(51) Int. Cl.
*A62B 35/04* (2006.01)
*A62B 35/00* (2006.01)
*B65H 54/80* (2006.01)

(52) U.S. Cl.
CPC .......... *A62B 35/04* (2013.01); *A62B 35/0075* (2013.01); *B65H 54/80* (2013.01); *B65H 2701/35* (2013.01)

(58) Field of Classification Search
CPC .... A62B 35/04; A62B 35/0075; B65H 54/80; B65H 2701/35; D03D 1/0005; F16F 7/006
USPC .......................................................... 248/548
See application file for complete search history.

(56) References Cited

U.S. PATENT DOCUMENTS

| | | | | |
|---|---|---|---|---|
| 4,253,544 A * | 3/1981 | Dalmaso | A62B 35/04 182/18 |
| 6,533,066 B1 * | 3/2003 | O'Dell | D03D 1/0005 182/4 |
| 9,498,659 B2 * | 11/2016 | Schurian | A62B 35/04 |
| 2016/0367845 A1 * | 12/2016 | Bouquier | D03D 1/0005 |

FOREIGN PATENT DOCUMENTS

| | | |
|---|---|---|
| EP | 2409733 B1 | 8/2016 |
| EP | 2896436 B1 | 9/2016 |
| WO | 2020/023649 A1 | 1/2020 |

* cited by examiner

*Primary Examiner* — Anita M King
(74) *Attorney, Agent, or Firm* — Oliff PLC

(57) ABSTRACT

An energy absorber has a textile element comprising two substrates connected to one another by breaking links and resistant links, the textile element being wound. A container receives the textile element. The container defines a first opening for a first end and a second opening for a second end of the textile element. The resistant link connects a portion of the two substrates and maintains the connection in response to a first stress applied between the first end and the second end. The breaking links break and absorb energy in response to a first stress between the first end and the second end of the textile element. The container is non-openable and defines an access hole opening out facing the centre of the textile element in wound state.

6 Claims, 5 Drawing Sheets

FIG.1
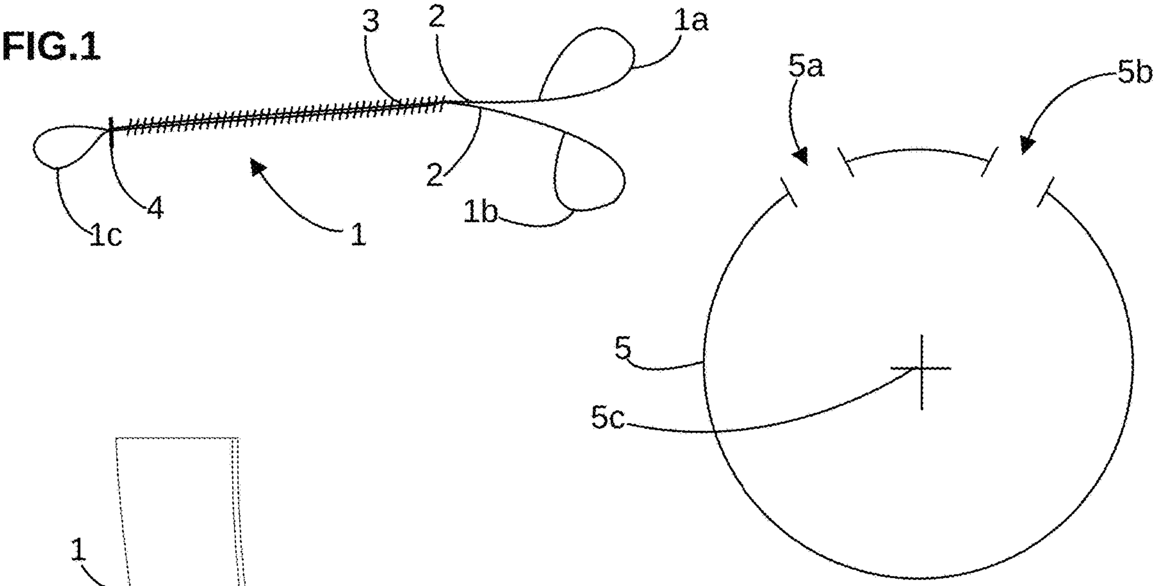
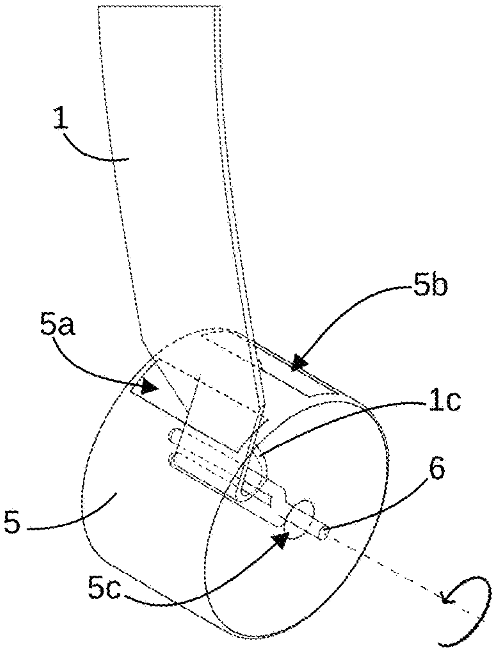
FIG.2
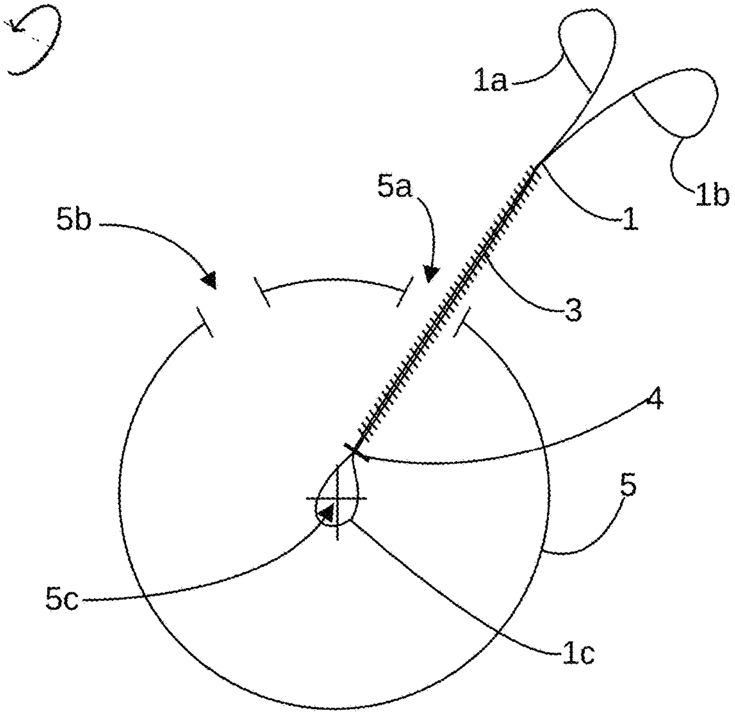
FIG.3

FIG.4
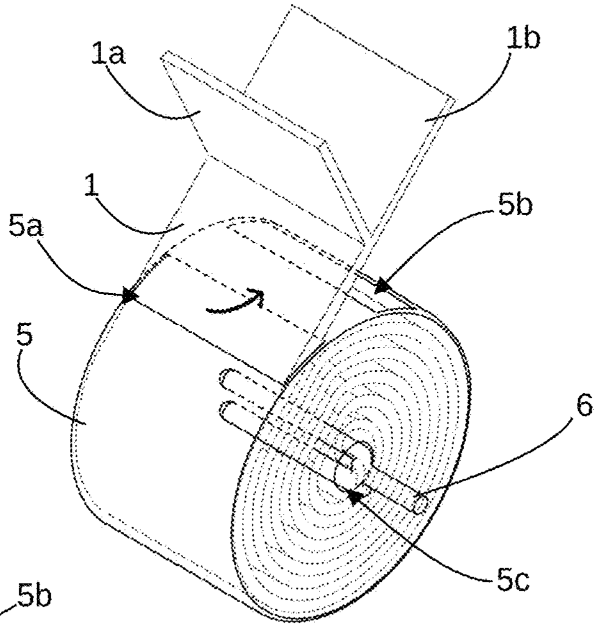
FIG.5
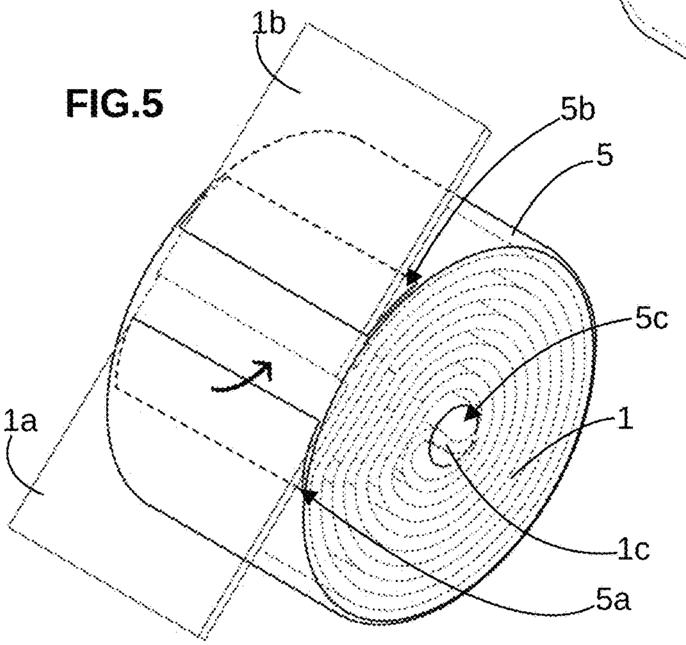
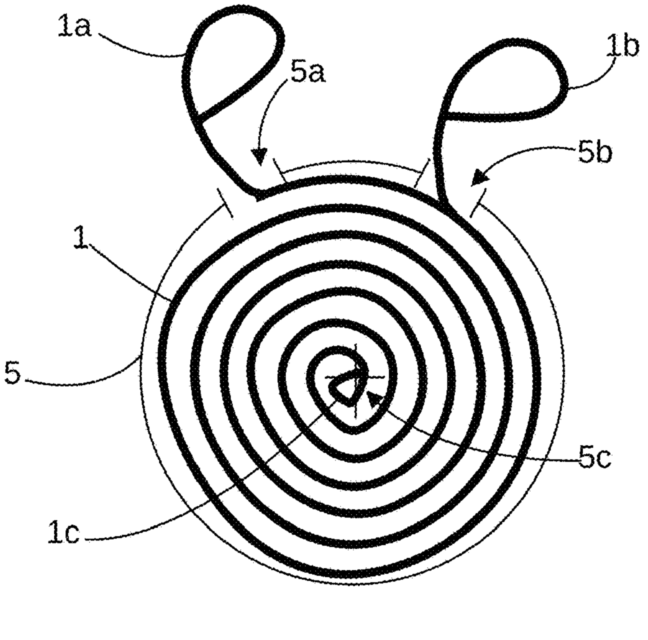
FIG.6

ENERGY ABSORBER AND METHOD FOR MANUFACTURING SUCH

BACKGROUND OF THE INVENTION

The invention relates to an energy absorber and to a method for manufacturing one such energy absorber.

PRIOR ART

In the field of work at heights and acrobatic recreational activities, it is known to connect a user and an anchor point by means of an energy absorber. In case of a fall, at least a part of the energy of the fall is absorbed by the energy absorber so as to limit the stresses on the anchorage and/or to limit the stresses on the harness supporting the user.

In the field of via ferrata, it is known to have a lanyard one end of which is formed by a loop designed to be attached to a user's harness and the other end of which receives two carabiners designed to be connected to a lifeline. The energy absorber is formed by two webbing strands stitched to one another and respectively connected to the first end and to the second end. In case of a fall, the two ends move in different directions and the stitched seams are subjected to a stress representative of a fall.

The seam is made up by breaking points so that the fall results in successive breaking of the different stitches joining the two webbing strands. Each breakage of a stitch absorbs a part of the energy.

It is therefore advantageous to have a distance of seam that is as long as possible so as to have staggered breaking of the stitches. Staggering of the stitches enables the stress felt by the user to be limited to a threshold value. However, the use of a large length of seam results in having to handle a bulky absorber.

The Edelrid company markets a via ferrata strap that comprises an energy absorption lanyard formed by two webbing straps sewn onto one another. The lanyard is wound on itself in the manner of a spiral before being installed in a container having a hinged cover. Once the lanyard has been installed in the container, the cover closes the container to keep the lanyard in its wound configuration. The container defines a first opening designed for exit of the first end of the energy absorption lanyard and a second opening designed for exit of the second end of the energy absorption lanyard.

It is apparent that this configuration is not advantageous as the container represents a large volume to allow the energy absorption lanyard to be installed. This may therefore present a hindrance for the user.

It is also known from the document EP2409733 to form an energy absorber in which a strap is wound round a drum that winds the strap automatically by means of a spring. The strap passes through a slot of a spindle urged by the spring to wind the strap in the absence of any external stress. The energy absorber has a first end formed by the strap and designed to be attached to a user and a second end designed to be attached to a safety device of a via ferrata.

Object of the Invention

One object of the invention consists in providing an energy absorber that is more compact than the prior art configurations.

This result tends to be achieved by means of an energy absorber comprising:

- a textile element comprising at least two substrates connected to one another by breaking links and resistant links, the textile element being wound;
- a container receiving the textile element in wound state, the container defining a first opening for a first end of the textile element and a second opening for a second end of the textile element.

The at least one resistant link connects a portion of the at least two substrates and is configured to maintain the connection in response to a first stress applied between the first end and the second end.

The breaking links are designed to break and to absorb energy in response to a first stress applied between the first end and the second end of the textile element.

The energy absorber is remarkable in that the container is non-openable and in that it defines at least one through access hole opening out facing the center of the textile element in wound state.

In advantageous manner, the textile element has a loop arranged facing said at least one through access hole.

In a particular configuration, the energy absorber comprises a rotation shaft fixed to the textile element, the rotation shaft being terminated by an indentation facing said at least one through access hole.

Another object of the invention is to provide a via ferrata lanyard that is more compact than the prior art configurations.

This result tends to be achieved by means of a via ferrata lanyard wherein one of the first end of the textile element and the second end of the textile element is designed to be attached to a roping harness. One or more carabiners are attached to the other of the first end of the textile element and the second end of the textile element.

It is a further object of the invention to provide a method for manufacturing an energy absorber that enables a more compact configuration to be formed while remaining easy to implement.

This result tends to be achieved by means of a method for manufacturing an energy absorber comprising the following steps:

- providing a textile element comprising at least two substrates connected to one another by breaking links and resistant links, and a container defining a first opening, a second opening and a through access hole;
- inserting a central part of the textile element in the container via the first opening until the latter is facing the through access hole;
- connecting a winding shaft to the central part of the textile element, the winding shaft passing through the through access hole;
- winding the textile element inside the container by means of the winding shaft;
- inserting the second end in the second opening, the first end being in the first opening.

Advantageously, the step of inserting the second end in the second opening, the first end being in the first opening, is performed before the textile element is wound inside the container by means of the winding shaft.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which:

FIG. 1 illustrates a schematic cross-sectional view of a first step of manufacturing an energy absorber;

FIG. 2 illustrates a schematic perspective view of a second step of manufacturing an energy absorber;

FIG. 3 illustrates a schematic cross-sectional view of a second step of manufacturing an energy absorber;

FIG. 4 illustrates a schematic perspective view of a third step of manufacturing an energy absorber;

FIG. 5 illustrates a schematic perspective view of a fourth step of manufacturing an energy absorber;

FIG. 6 illustrates a schematic cross-sectional view of a fourth step of manufacturing an energy absorber;

DESCRIPTION OF THE EMBODIMENTS

Figure 7:
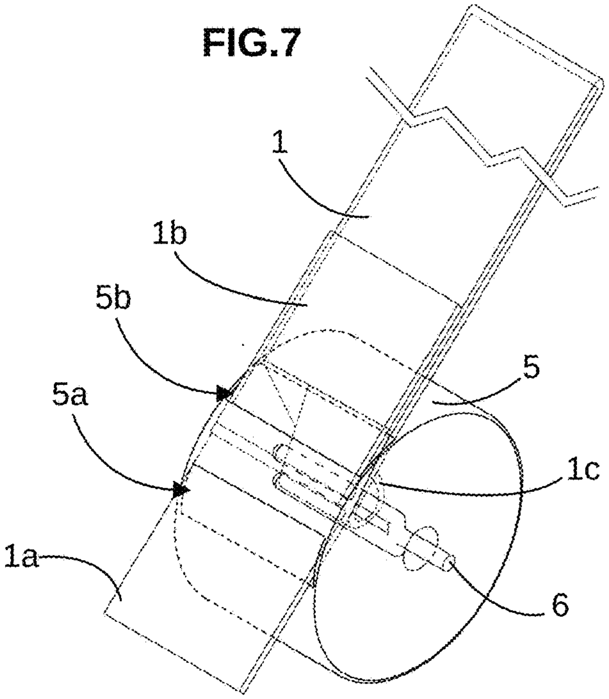
FIG. 7 illustrates a schematic perspective view of a second step of manufacturing an energy absorber according to another embodiment.
Figure 8:
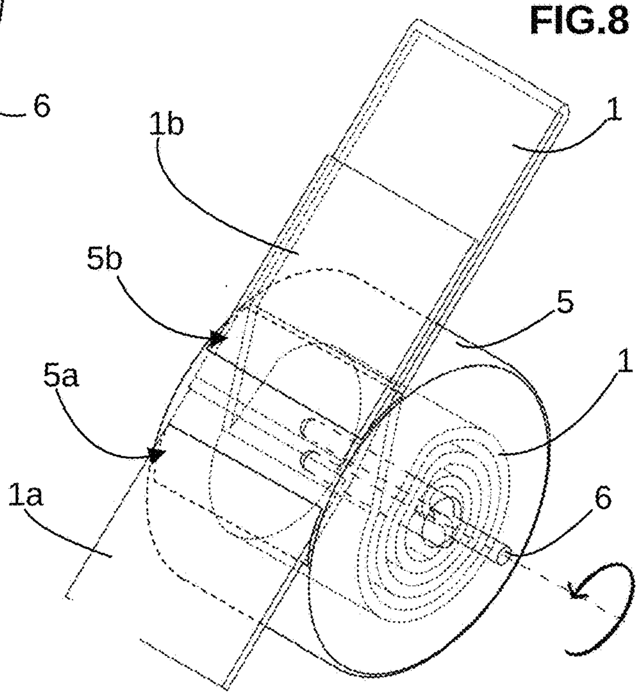
FIG. 8 illustrates a schematic perspective view of a third step of manufacturing an energy absorber according to another embodiment.
Figure 9:
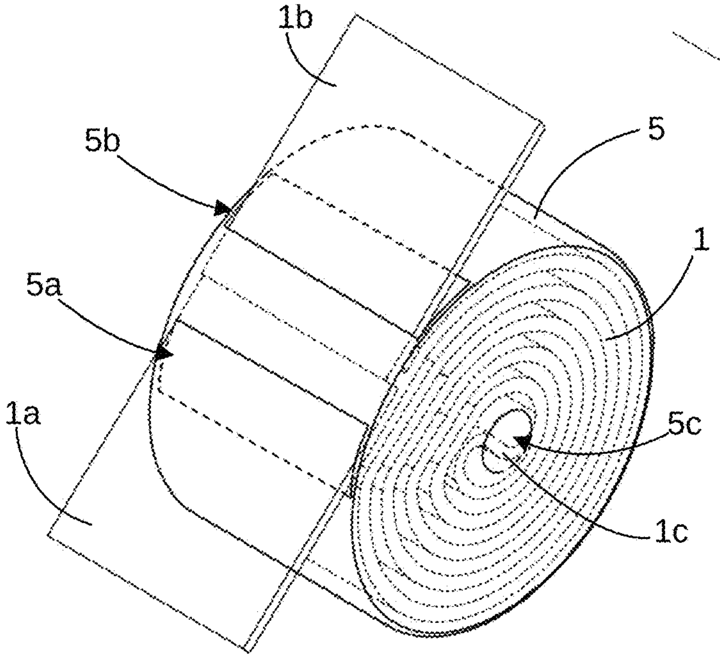
FIG. 9 illustrates a schematic perspective view of a fourth step of manufacturing an energy absorber according to another embodiment.
Figure 10:
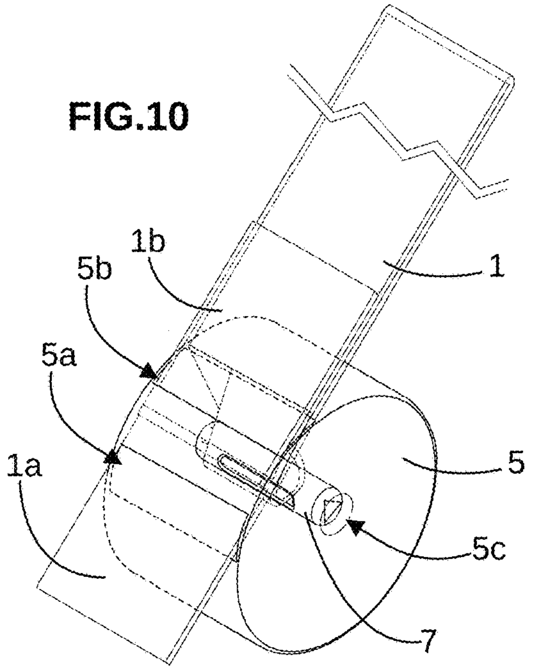
FIG. 10 illustrates a schematic perspective view of an energy absorber the textile element of which is provided with an indentation designed to operate in conjunction with a winding shaft.
Figure 11:
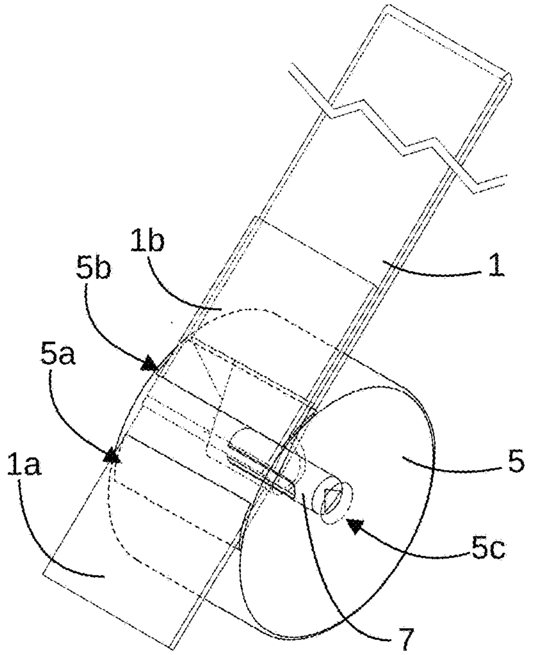
FIG. 11 illustrates another schematic perspective view of an energy absorber the textile element of which is provided with an indentation designed to operate in conjunction with a winding shaft.

FIGS. 1 to 14 illustrate an energy absorber for work at heights and for acrobatic activities. The energy absorber is preferentially used for recreational activities, for example for via ferrata.

The energy absorber comprises a textile element 1 comprising at least two substrates 2 joined to one another by breaking links 3 and at least one resistant link 4, preferably several resistant links 4. The two substrates 2 can be of any nature, for example two webbing straps, two fabrics, a webbing strap and a fabric. The textile element 1 has a first end 1*a* and a second end 1*b* different from the first end 1*a*. The position of the first end 1*a* with respect to the second end 1*b* is indifferent. One of the first end 1*a* and the second end 1*b* is designed to be attached to the user whereas the other of the first end 1*a* and the second end 1*b* is designed to be attached to an anchor point for example by means of a carabiner.

The two substrates 2 are mechanically secured to one another by means of a first set of the breaking links 3 and by means of a second set of resistant links 4. The breaking links 3 are links designed to break and absorb energy in response to a first stress applied between the first end 1*a* and the second end 1*b*. In case of a fall, the first end 1*a* and the second end 1*b* seek to move with respect to one another. They apply a stress on at least a part of the breaking links 3. Once a first stress value has been reached, the breaking links 3 deform and then break. It is advantageous for the breaking links 3 to deform plastically before they break. Deformation of the breaking links 3 enables fall energy to be dissipated. The stress value above which the breaking link 3 yields defines the stress value felt by the user at the time of falling.

On the contrary, the resistant links 4 are configured to withstand the first stress and are preferably configured to withstand much higher stresses than the first stress. The resistant links 4 enable the mechanical connection between the two substrates 2 to be preserved.

The resistant links 4 are arranged to be subjected to the stress after the breaking links 3 have broken.

Implementation of these breaking links 3 and the resistant links 4 is known as such. The breaking links 3 can be seams or binding threads originating from a weaving operation. The resistant links 4 can be seams, binding threads or other wires, or even rivets, welds, an adhesive or any other means performing the mechanical connection between the two substrates 2.

In one embodiment, the two substrates 2 can be two plies that are woven at the same time and that are connected by a binding thread forming breaking links. For example, the resistant links 4 are formed by seams on the two plies and/or by another weaving pattern of the binding thread and/or by a modification of the binding thread as regards its diameter, its chemical composition or any other parameter enabling its mechanical behaviour to be modified. In another embodiment, the two substrates 2 are two portions of a woven element that is folded over. The two portions are secured to one another by the breaking links, preferably by stitching. It is possible to form the resistant links 4, for example by stitching, or to use the threads that form the weave as resistant links performing the mechanical connection between the first end and the second end after the breaking links 3 have broken.

The energy absorber comprises a container 5 that receives the textile element 1 comprising the breaking links 3. To gain in compactness, the textile element 1 is present in the container 5 in its wound form. In preferential manner, the container 5 is of circular or nearly circular shape and has a volume substantially equal to that of the textile element 1. The assembly formed by the textile element 1 and the container 5 is more compact than the prior art configurations for the same volume of the textile element 1 thereby enabling a more compact general configuration to be had for the same energy absorption value without modifying or almost without modifying the textile element 1.

The container 5 is a non-openable container, i.e. it prevents insertion of already wound the textile element 1 into the container 5. The container 5 defines a first opening 5*a* and a second opening 5*b* that allow access to the inside of the container 5. The first opening 5*a* forms a first exit for a first end 1*a* of the textile element 1 and the second opening 5*b* forms a second exit for a second end 1*b* of the textile element 1. The first end 1*a* can be the end designed to be connected to the user or to the anchor point. The first opening 5*a* and the second opening 5*b* do not present a cross-section allowing insertion of wound the textile element 1.

The container 5 defines at least one access hole 5*c* in addition to the two openings. The access hole 5*c* opens out facing the center of the wound the textile element 1 arranged inside the container 5. As the container 5 has a nearly circular or circular shape, the access hole 5*c* is situated in the center of the circular or nearly circular shape. It is possible not to have a purely circular shape to facilitate exit and to allow the two ends of the textile element to work more easily. The access hole 5*c* can be achieved in any manner. FIG. 1 illustrates an access hole 5*c* in the form of one or more cut-outs enabling insertion in the container or in the form of a wider hole.

The method for manufacturing an energy absorber can comprise the following steps.

As illustrated in FIG. 1, in a first step, the textile element 1 is provided comprising at least two substrates 2 connected to one another by breaking links 3 and resistant links 4, and the container 5 is provided defining a first opening 5*a*, a second opening 5*b* and an access hole 5*c* opening inside the container 5.

Then, as illustrated in FIGS. 2 and 3, a central part 1*c* of the textile element 1 is inserted into the container 5 via the first opening 5*a* and the central part 1*c* is placed facing the access hole 5*c*. In one embodiment, the central part 1*c* is inserted directly via the first opening 5*a* to be facing the access hole 5*c*. In another embodiment illustrated in FIGS. 7 and 12, the central part 1*c* is inserted via one or the other of the openings. The first end 1*a* of the textile element 1 exits from container 5 via the first opening 5*a* and the second end 1*b* exits from the container via the second opening 5*b*. The opposite configuration is possible. The central part 1*c* is a part arranged between the first end 1*a* and the second end 1*b* when the seams forming the breaking links 3 have yielded. The central part 1*c* is preferably located to equal distance from the first end 1*a* and the second end 1*b*.

A winding shaft 6 is then connected to the central part 1*c*. The winding shaft 6 passes through the access hole 5*c*. The textile element 1 is wound inside the container 5 by means of the winding shaft 6. The winding shaft 6 defines a rotation axis that passes through the wall of the container 5. The winding shaft 6 rotates on itself inside the access hole 5*c* resulting in the textile element 1 being wound around the rotation axis defined by the winding shaft 6.

As the winding shaft 6 makes its rotations, the textile element 1 is progressively wound in the form of a spiral until the whole of the textile element 1 is arranged inside the container 5 in wound form, except for the first end 1*a* and the second end 1*b*. As the textile element 1 is wound inside the container 5, it is possible to form a more compact winding by adjusting the winding parameters, in particular the tension in the textile element 1 when winding is performed. Since the textile element 1 is not moved in its wound configuration to be inserted in container 1, the compactness of the winding is preserved.

When on completion of the winding operation, the two ends of the textile element 1 pass through the same opening, for example the first opening 5*a*, it is advantageous to move one of the ends so that the latter passes through the container 5 via an opening that is dedicated thereto, for example the second opening 5*b*.

In preferential manner, the container 5 is a supple container. As the latter is designed to come into contact with the user, it is preferable for it to be supple to limit the risks of injury. Advantageously, the container 5 made from textile material, for example a supple polymer material.

It is particularly advantageous for the textile element 1 to be in the form of a strap, i.e. with a length that is larger than its width, itself larger than its thickness. For example, the textile element has a rectangular cross-section. More preferentially, the width of the container is less than twice the width of the textile element. Even more preferentially, the ratio of the width of the container over the width of the textile element is less than 1.5 or even 1.2. Such an embodiment is illustrated in FIGS. 2, 4, 5, 7, 8 and 9.

In advantageous manner, the dimension of the access hole 5*c* is smaller than the width of the textile element 1. The width of the textile element 1 is preferentially the dimension parallel to the rotation axis of wound the textile element 1.

To facilitate gripping of the central part 1*c* by the winding shaft 6, the central part 1*c* of the textile element 1 can be provided with a loop that is closed by a resistant link 4 or a breaking link 3. The winding shaft 6 preferentially has a groove. A part of the loop is wedged in the groove ensuring that the winding shaft 6 is properly installed with the central part 1*c*. In an alternative embodiment illustrated in FIGS. 10 and 11, the central part 1*c* of the textile element 1 is equipped with a rotation shaft provided with an indentation 7 designed to operate in conjunction with a complementary indentation of the winding shaft 6. In the illustrated embodiments, the indentation 7 is of triangular shape, but another shape is possible. In the embodiment illustrated in FIG. 10, the indentation 7 is irremovable from the textile element 1. The indentation 7 is fixed to the textile element 1 before the resistant links and/or the breaking links are formed. In the embodiment illustrated in FIG. 11, the indentation 7 is irremovable with respect to the textile element 1 before the textile element 1 has been installed in the container 5.

Preferentially, the shape of the indentation 7 is chosen so as to only allow winding in a single direction to prevent incorrect assembly of the textile element 1 in the container 5. Such a precaution is advantageous when the first opening 5*a* and the second opening 5*b* are not identical and the first end 1*a* and the second end 1*b* have different characteristics in order to interact better with the user and the anchor point.

Depending on the configurations, the container 5 can comprise a single access hole 5*c* or two access holes arranged on the opposite faces of the container 5 so as to define a though access hole. The use of a through access hole can be advantageous for a winding shaft 6 that passes through the container 5. This can enable the textile element 1 to be wound better. The winding shaft 6 passes through the container 5 along the winding axis of the textile element 1 which is the rotation axis of wound the textile element 1 when a fall occurs.

Figure 12:
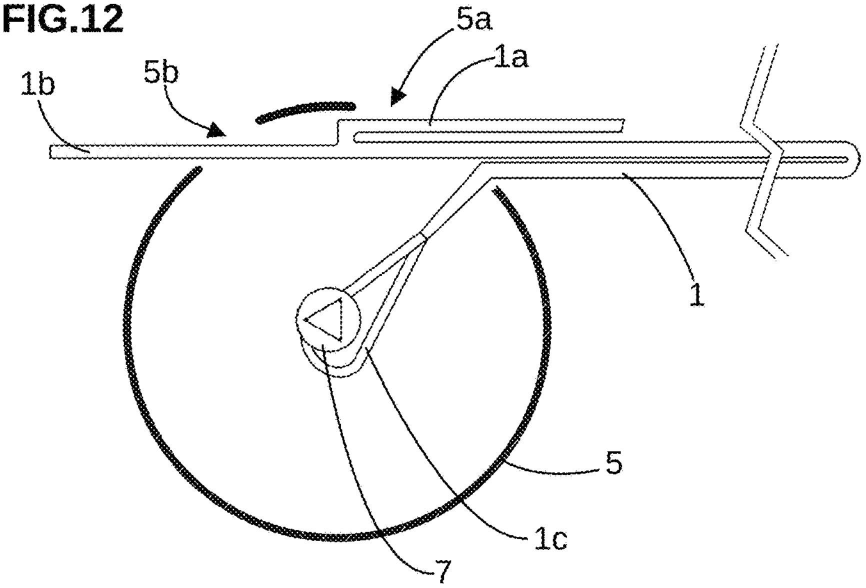
FIG. 12 illustrates a schematic cross-sectional view of an energy absorber the textile element of which is provided with an indentation designed to operate in conjunction with a winding shaft.

As illustrated in FIG. 12, the two ends of the textile element 1 are arranged in such a way as to exit via a specific opening before winding is performed or before winding around the rotation axis has been completed.

Figure 13:
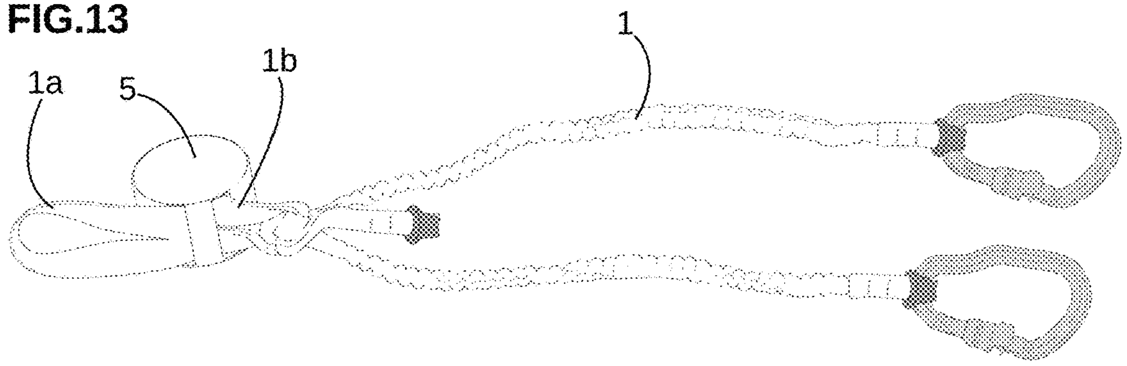
FIG. 13 illustrates a schematic perspective view of a lanyard comprising an energy absorber.

Such an energy absorber is particularly advantageous in a via ferrata lanyard such as the one illustrated in FIG. 13. One of the first end 1*a* of the textile element 1 and the second end 1*b* of the textile element 1 is designed to be fixed to a roping harness. One or more carabiners are attached to the other of the first end la of the textile element 1 and the second end 1*b* of the textile element 1.

In case of a fall, the breaking links 3 break and the length of the textile element 1 exiting from the container 5 increases enabling at least partial breaking of the breaking links 3 to be detected.

Figure 14:
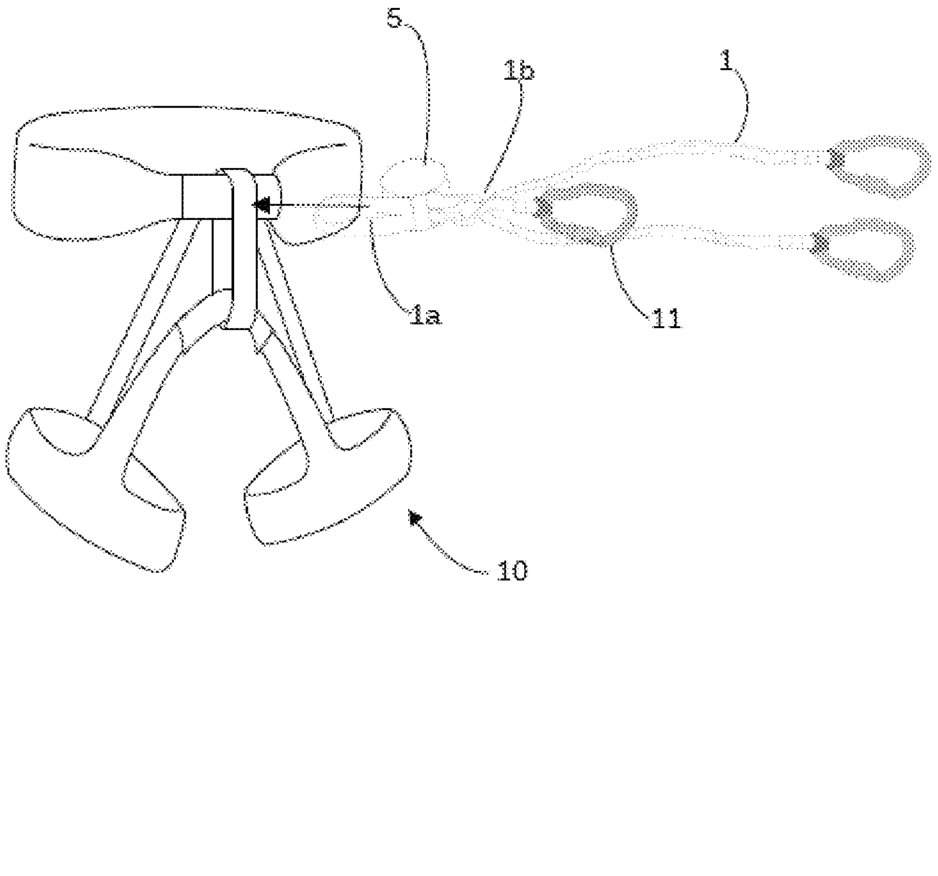
FIG. 14 illustrates a schematic perspective view of a lanyard attached to a roping harness and with an attached carabiner.

As illustrated in FIG. 14, a via ferrata lanyard such as the one illustrated in FIG. 13 is shown with the first end la of the textile element attached to a roping harness 10 and with a carabiner 11 attached to the second end 1*b* of the textile element.

The invention claimed is:

1. An energy absorber comprising:

a textile element comprising at least two substrates connected to one another by breaking links and at least one resistant link, the textile element being wound;

a container receiving the textile element in wound state, the container defining a first opening for a first end of the textile element and a second opening for a second end of the textile element;

wherein the at least one resistant link connects a portion of the at least two substrates and is configured to maintain the connection in response to a first stress applied between the first end and the second end; and wherein the breaking links are designed to break and to absorb energy in response to a first stress applied between the first end and the second end of the textile element;

wherein the container is non-openable and wherein the container defines at least one access hole facing a center of the textile element arranged in wound state in the container.

2. The energy absorber according to claim 1 wherein the textile element has a loop arranged facing said at least one access hole.

3. The energy absorber according to claim 1 comprising a rotation shaft fixed to the textile element, the rotation shaft being terminated by an indentation facing said at least one access hole.

4. A via ferrata lanyard comprising an energy absorber according to claim 1 wherein one of the first end of the textile element and the second end of the textile element is designed to be attached to a roping harness and wherein one or more carabiners are attached to the other of the first end of the textile element and the second end of the textile element.

5. A method for manufacturing an energy absorber comprising the following steps:

providing a textile element comprising at least two substrates connected to one another by breaking links and resistant links, and a container defining a first opening, a second opening and at least one access hole opening inside the container;

inserting a central part of the textile element in the container via the first opening until the central part of the textile element is facing the at least one access hole;

connecting a winding shaft to the central part of the textile element, the winding shaft passing through the at least one access hole;

winding the textile element inside the container by the winding shaft;

inserting the second end in the second opening, the first end being in the first opening.

6. The method for manufacturing an energy absorber according to claim 5 wherein the step of inserting the second end in the second opening, the first end being in the first opening, is performed before the textile element is wound inside the container by means of the winding shaft.

* * * * *